Aug. 22, 1961  E. P. BRINKEL  2,997,066
FLUID-ACTUATED SHIFTABLE MECHANISM
Filed April 30, 1959  9 Sheets-Sheet 1

INVENTOR.
Edwin P. Brinkel
BY
Harness, Dickey & Pierce.
ATTORNEYS.

Aug. 22, 1961 E. P. BRINKEL 2,997,066
FLUID-ACTUATED SHIFTABLE MECHANISM
Filed April 30, 1959 9 Sheets-Sheet 3

INVENTOR
Edwin P. Brinkel
BY
Harness, Dickey & Pierce
ATTORNEYS.

U
United States Patent Office 2,997,066
Patented Aug. 22, 1961

2,997,066
FLUID-ACTUATED SHIFTABLE MECHANISM
Edwin P. Brinkel, Royal Oak, Mich., assignor to Ross Operating Valve Company, Detroit, Mich., a corporation of Michigan
Filed Apr. 30, 1959, Ser. No. 810,034
18 Claims. (Cl. 137—622)

This invention relates to valves, and more particularly to fluid-actuated shiftable mechanisms for achieving alternate shifting of an element between two positions in response to a momentary signal. This application pertains to a mechanism having the same general function as that disclosed and claimed in copending application Serial No. 691,858 filed October 23, 1957 by the present applicant and assigned to the assignee of this application, this application having now matured into Patent No. 2,921,602 issued January 19, 1960.

It is an object of the present invention to provide a novel and improved fluid-actuated shiftable mechanism which entirely eliminates the need for any mechanical locks or detents, these having been found in many cases to require very close tolerances and a careful selection of materials.

It is another object to provide an improved mechanism of this nature which operates entirely by the use of fluid actuated elements, is of relatively inexpensive construction and requires a minimum of maintenance.

It is a further object to provide an improved shiftable mechanism of the above character which is of versatile construction, may be installed in combination with its controlled or controlling components, and is extremely reliable in use.

It is another object to provide an improved shiftable mechanism of this nature which may be arranged in groups to achieve a variety of desired operational sequences.

Other objects, features and advantages of the present invention will become apparent from the following description taken in conjunction with the accompanying drawings, in which.

In general terms, the illustrated embodiments of the invention each comprises a housing having a plurality of valve spools and other components such as check valves, the assembly being connectable to a source of momentary fluid pressure such as a pilot valve. The pilot valve could be actuated in any manner such as manually, by means of a solenoid, or by cam actuation. The novel mechanism is adapted to respond to each momentary application and release of pressure in order to shift a fluid actuated motor between two positions. Upon the first application of pressure from the pilot valve the fluid motor would shift from a first to a second position, and would stay in this position after the pilot valve pressure was released. Upon the second application of pilot valve pressure to the mechanism, the fluid motor would be caused to shift back to its first position. The fluid motor could control any desired mechanism such as, for example, a diverting gate in a conveyor system or the main valve of a fluid system.

In the shiftable mechanism described in the aforementioned copending application, a control spool was provided which shifted in response to the momentary application and withdrawal of pressure from the pilot valve. An actuating spool was also provided, this spool shifting once each time the control spool moved in one direction and maintaining its position when the control spool returned. The actuating spool controlled the supply and exhaust to the fluid motor, and a mechanical detent or lock connected the control spool and the actuating spool.

According to the present invention, the mechanical detent is entirely eliminated, and the actuating spool is controlled by several other valve spools, the connections between the spools being such that a foolproof and efficient actuating spool shift is effected.

Referring to the embodiment of the invention shown in FIGURES 1–20, FIGURE 1 (which uses symbols adopted by the Joint Industry Conference) shows a mechanism generally indicated at 101 having a three-way valve spool 102 with a supply port 103, a working port 104 and an exhaust port 105. As is seen best in FIGURE 2, port 104 is adapted to be connected to a fluid motor 110, whereby pressurizing of port 104 will move the motor in one direction and connection of port 104 to exhaust will permit movement of the motor in the opposite direction. Valve spool 102 is shiftable between a first position in which port 104 is connected to supply port 103, and a second position in which the working port is connected to exhaust port 105.

Figures 1, 2:
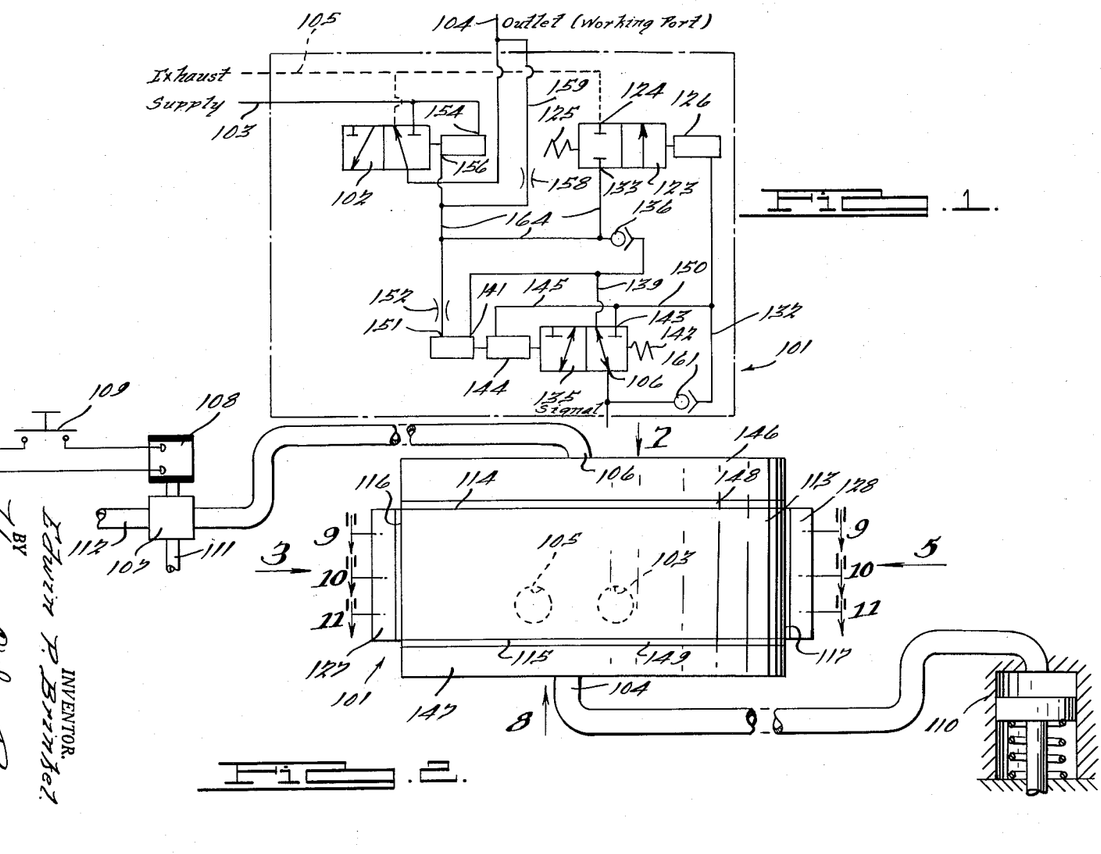
FIGURE 1 is a schematic circuit diagram showing the components of one embodiment of the invention using three valve spools.
FIGURE 2 is a partially schematic view of a system using the invention, showing the shiftable mechanism housing and covers in elevation.

A signal port 106 is also connected to unit 101 and is adapted to be controlled by a pilot valve 107, seen in FIGURE 2. This pilot valve may be operated by any appropriate means such as a solenoid 108 momentarily energizable by a push button switch 109. For illustrative purposes, it may be assumed that when solenoid 108 is in its deenergized position, port 106 will be connected to an exhaust port 111, while energization of solenoid 108 will cause valve 107 to shift so as to connect port 106 with a fluid pressure supply port 112. It should be noted that although the schematic showing in FIGURE 2 illustrates a pilot valve 107 and motor 110 as being separated from unit 101, one or both of components 106 and 107 could be combined with unit 101 in a unitary structure such as a "sandwich" construction.

Figure 6:
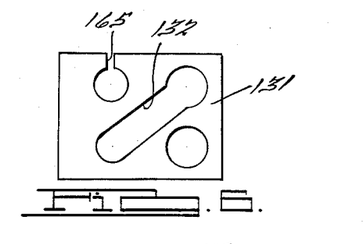
FIGURE 6 is an elevational view of the gasket adjacent the surface shown in FIGURE 5.
Figure 9:
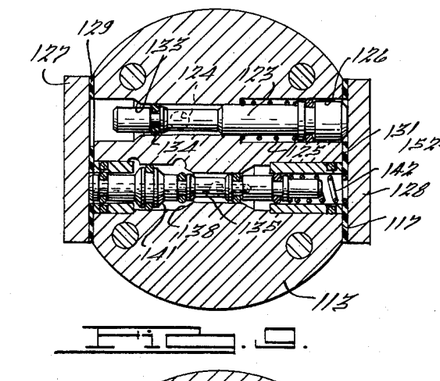
FIGURES 9, 10 and 11 are cross-sectional views taken along the lines 9—9, 10—10 and 11—11, respectively, of FIGURE 2 and showing the various mechanism components in a starting position, pressurized portions of the mechanism being indicated by dots.
Figure 12:
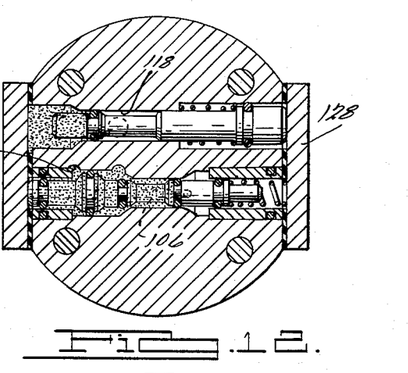
Figure 13:
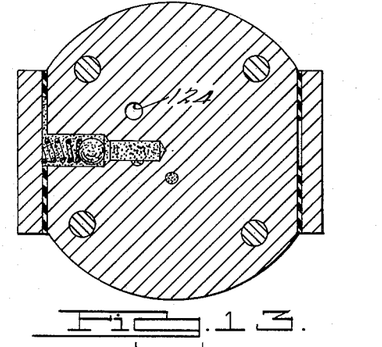

Unit 101 comprises a disk-shaped block or housing 113 having flat surfaces 114 and 115 at opposite sides thereof, and additional flat surfaces 116 and 117 at opposite sides of the peripheral disk wall. Four bores 118, 119, 121 and 122 are provided in housing 113, these bores extending between surfaces 116 and 117. Bore 118 carries a valve spool 123 and has a port 124 at a central portion thereof which is connected with exhaust port 105. A spring 125 urges spool 123 toward surface 117 of the housing, the spool forming a chamber 126 at this end of bore 118. Cover plates 127 and 128 are secured to surfaces 116 and 117, respectively, with gaskets 129 and 131 being disposed between the cover plates and their corresponding surfaces. As seen in FIGURE 6, gasket 131 has a diagonal passage 132 connecting chamber 126 with the corresponding end of bore 122. A chamber 133 is formed at the opposite end of valve spool 123. When spool 123 is in its right-hand position as shown in FIGURES 9, 12 and 15, a seal 134 will separate chamber 133 from exhaust port 124, but when the valve spool is shifted to its left-hand position as seen in FIGURE 18, chamber 133 will be connected to exhaust.

Bore 119 carries a valve spool 135, and a central portion of this bore is connected to signal port 106. Valve 135 is adapted to be shifted between a first position in which the signal port is connected to a check valve 136, and a second position in which the signal port is connected to chamber 126. Check valve 136 is disposed in a bore 137 extending inwardly from surface 116 of the housing. The inner end of bore 137 is connected to a chamber 138 in bore 119 by a passage 139, pressure in this passage tending to lift the check valve off its seat. When valve spool 135 is in its left-hand position as seen in FIGURES 9 and 12, signal port 106 will be connected with chamber 138. A piston area 141 and a spring 142 urge spool 135 to its left-hand position.

Figure 7:
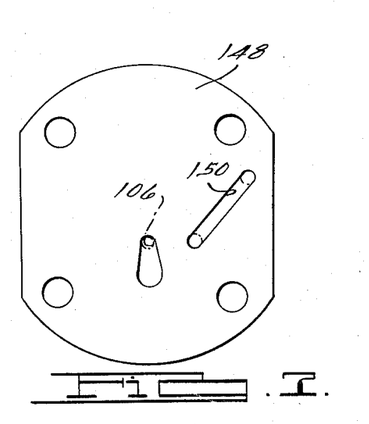
FIGURE 7 is a top plan view of the top gasket taken in the direction of the arrow 7 of FIGURE 2 and showing the pressure and signal connections.
Figure 15:
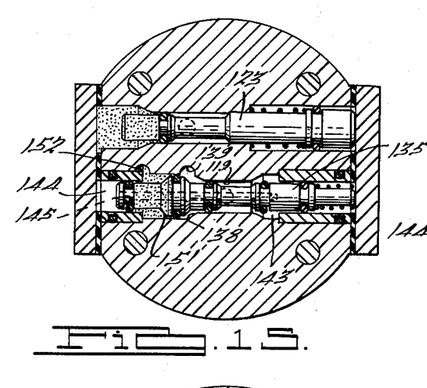
FIGURES 15, 16 and 17 are views showing the parts after pressure has been removed from the signal connection.
Figure 16:
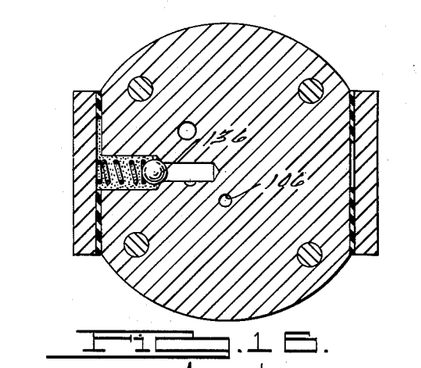
Figure 17:
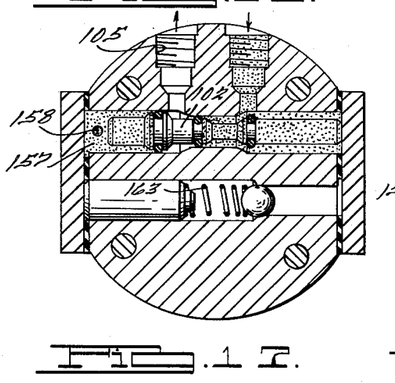
Figure 18:
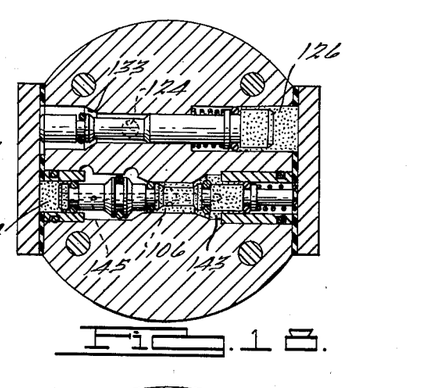
FIGURES 18, 19 and 20 are views showing the parts after reapplication of signal pressure.
Figure 19:
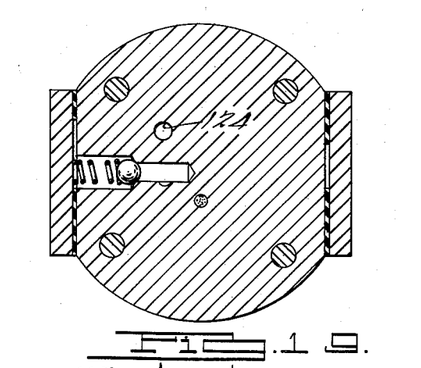

A chamber 143 is provided at the right-hand end of bore 119 and is connected to signal port 106 when spool 135 is in its right-hand position as seen in FIGURES 15 and 18. Chamber 143 is connected to a chamber 144 at the left-hand end of bore 119 by an axial passage 145 within spool 135. Chamber 144 provides a piston area urging spool 135 to the right. Cover plates 146 and 147 are provided for surfaces 114 and 115, respectively, of housing 113, gaskets 148 and 149 being provided between these cover plates and their corresponding surfaces. As seen in FIGURE 7, gasket 148 has a passage 150 which connects chamber 143 with chamber 126. A piston area 151 is also provided on spool 135 in opposition to piston area 141, this piston area being connected by a restricted opening 152 to the side of check valve 136 opposite that connected to passage 139.

Figure 8:
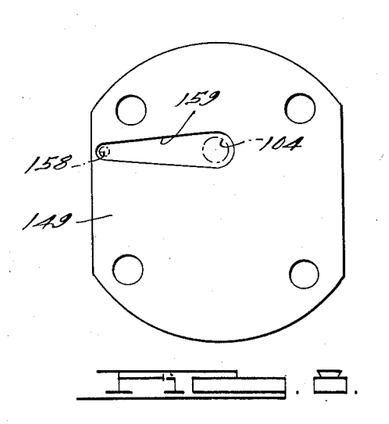
FIGURE 8 is a top plan view of the bottom gasket taken in the direction of the arrow 7 of FIGURE 2 and showing the working port.
Figures 11, 14:
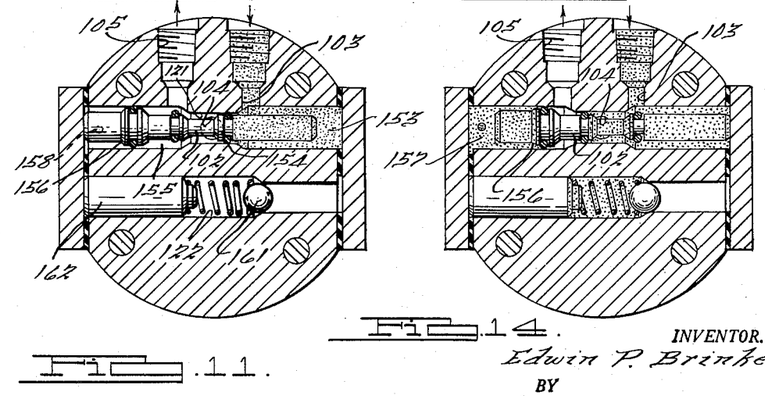
FIGURES 12, 13 and 14 are views similar to FIGURES 9, 10 and 11, respectively, showing the parts in a second position after initial application of pressure to the signal connection.
Figure 20:
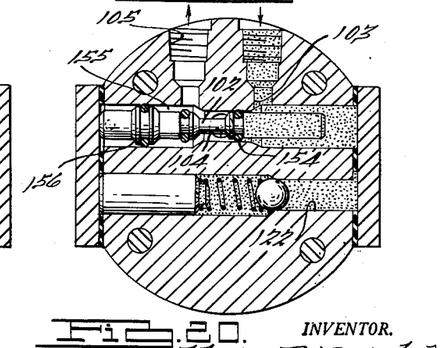

Bore 121 carries valve spool 102 and working port 104 is connected to the central portion of this bore and extends to the underside of unit 101. Supply port 103 is connected to a chamber 153 at the right-hand end of bore 121, the valve spool having a piston area 154 within this chamber. When spool 102 is in its right-hand position as shown in FIGURES 14 and 15, chamber 153 will be connected with working port 104. An exhaust chamber 155 is disposed on the left-hand side of port 104 as seen in the sectional views, and is connected to exhaust port 105. A differential area 156 of larger size than area 154 is disposed in a chamber 157 at the left-hand end of bore 121, chamber 157 being connected to a working port 104 through a restricted passageway 158 and a passage 159 formed in gasket 149, as seen in FIGURE 8. When spool 102 is in its left-hand position as seen in FIGURES 11 and 20, working port 104 will be connected with exhaust chamber 155.

Bore 122 carries a check valve 161, this valve being held in position by a plug 162 in the left-hand side of bore 122, a spring 163 being disposed between this plug and the check valve. The chamber in bore 122 to the left of check valve 161 is connected to signal port 106. As previously described, the right-hand end of bore 122 is connected to chamber 126 by means of passage 132 in gasket 131.

Figure 4:
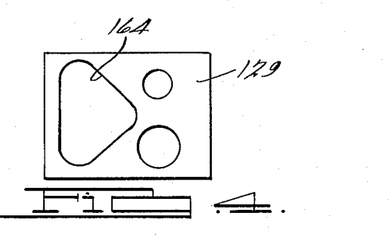
FIGURE 4 is an elevational view of the gasket adjacent the housing surface shown in FIGURE 3.
Figure 5:
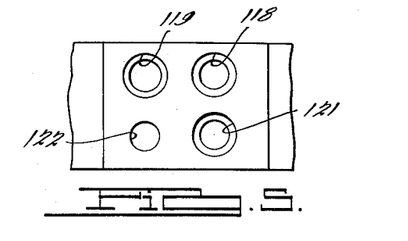
FIGURE 5 is a fragmentary elevational view taken in the direction of the arrow 5 of FIGURE 2 and showing the surface of the housing opposite that shown in FIGURE 3.

As seen in FIGURE 4, gasket 129 is provided with a triangular opening 164 which serves to connect bore 137 with bores 118 and 121. This serves in effect to connect working port 104, through gasket passage 159, restriction 158 and chamber 157, with chamber 133 of bore 118 and to the exit side of check valve 136. It will be noted that differential area 151 of valve spool 135 is also connected to this side of the check valve through restriction 152. Gasket 131 is further provided with an opening 165 leading from the chamber in bore 119 which contains spring 142.

*Operation*

Figure 1A:
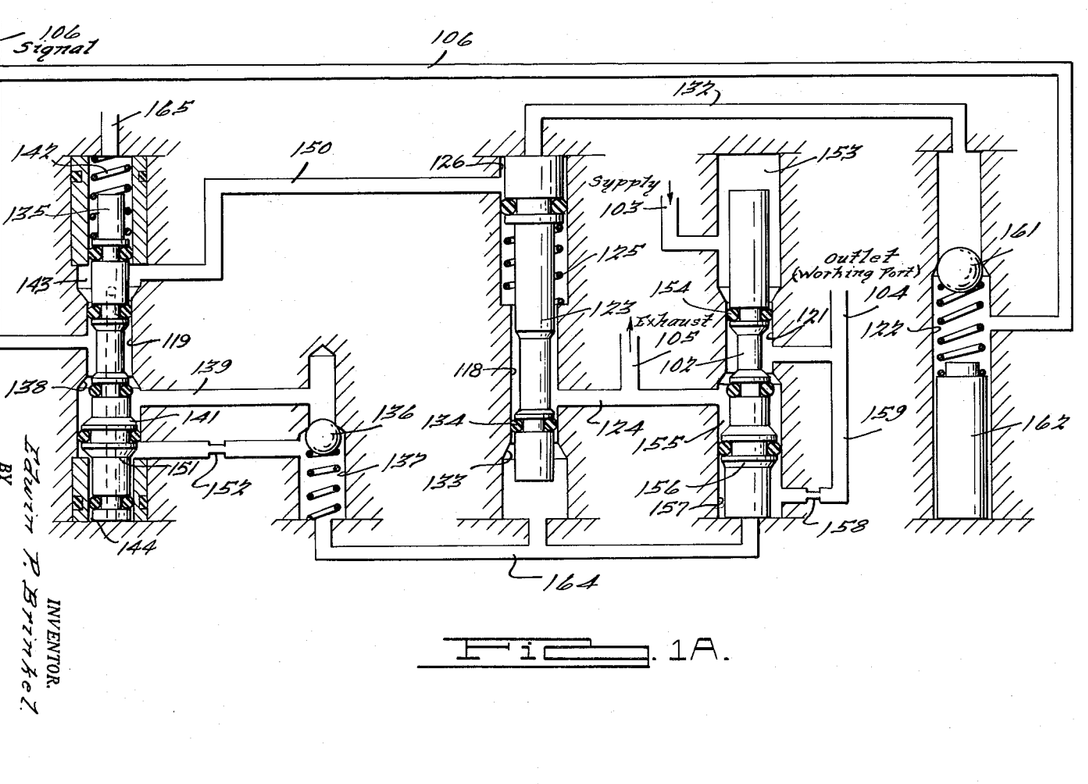
FIGURE 1A is another form of this schematic circuit diagram showing suitable valve constructions.
Figure 3:
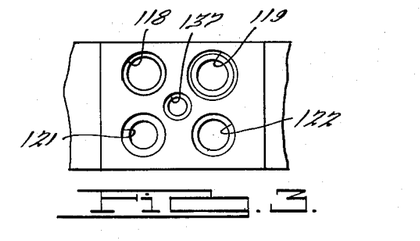
FIGURE 3 is a fragmentary end elevational view of the housing taken in the direction of the arrow 3 of FIGURE 2 and showing the locations of the valve spool and check valve bores.
Figure 10:
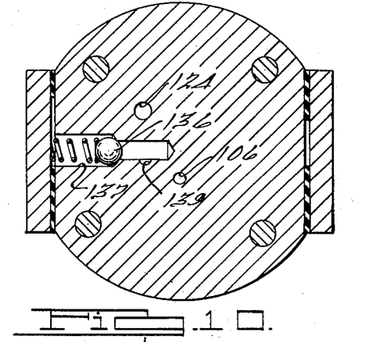

In studying the operation of unit 101, reference may be made to the schematic diagrams of FIGURES 1 and 1A as well as the sequential showings of FIGURES 9–20 which show the valve spools in their different positions. FIGURES 1 and 1A show the unit with the valve spools in their assumed starting positions, which are the same as the positions in the fourth step of the sequence of operations. FIGURES 9–11 also show the parts in this condition, whereas each of the next three groups of figures show the parts in their first, second, and third positions, respectively.

Assuming starting conditions in which pilot valve 107 in FIGURE 2 is connected to exhaust, with solenoid 108 deenergized, signal port 106 will be connected to exhaust as will working port 104. It may thus be assumed that fluid motor 110 is in its upper position in FIGURE 2.

When push button 109 is depressed, solenoid 108 will be energized to move pilot valve 107 to its supply position. This will cause signal port 106 to be pressurized, the pressure flowing through chamber 138 of bore 119, passage 139, check valve 136, bore 137 and passage 164 to chamber 157 of bore 121. The pressure in chamber 138 will cause piston area 141 to be pressurized, while the pressure in chamber 157 will cause piston area 156 to be pressurized, as seen in FIGURE 14. Piston area 156 will overcome the pressure on piston area 154, shifting valve spool 102 to the right in FIGURE 1, or upwardly in FIGURE 1A. This will cause working port 104 to be connected to supply port 103, moving motor 110 downwardly. Piston area 151 of valve spool 135 will also be pressurized through restriction 152 which leads from check valve bore 137, the pressure on this piston area balancing the pressure on piston area 141. However, valve spool 135 will not shift at this time due to the presence of spring 142. The presence of restriction 152 will insure that piston area 151 is not pressurized before piston area 141, so that there will be no danger of valve spool 135 shifting to the right in FIGURE 1 (upwardly in FIGURE 1A) at this time.

Upon release of push button 109 solenoid 108 will be deenergized, causing pilot valve 107 to shift to its exhaust position. As signal port 106 is connected to exhaust, piston area 141 will likewise be depressurized, and the pressure on piston area 151 will overcome spring 142 and cause valve spool 135 to shift to the right as shown in FIGURE 15 (upwardly in FIGURE 1). It will be noted that, since the pressure in chamber 157 as well as the pressure exerted on piston area 151 is trapped by check valve 136, the exhaustion of signal port 106 will not affect the position of valve spool 102, so that working port 104 will still remain connected to supply port 103. Furthermore, working port 104 will be connected with chamber 157 through gasket passage 159 and restriction 158, so that any leakage past check valve 136 will be replenished, thus insuring the maintenance of valve spools 102 and 135 in the positions of FIGURES 17 and 15, respectively.

When push button 109 is again depressed, signal port 106 will be pressurized, and with valve spool 135 in the position of FIGURE 15, (the upper position in FIGURE 1A), pressure will be conducted through chamber 143 and passage 145 to chamber 144, as shown in FIGURE 18 (at the bottom of bore 119 in FIGURE 1A). Since chamber 143 is connected to chamber 126 (at the top of bore 118 in FIGURE 1A) by gasket passage 150, this chamber will be pressurized, overcoming spring 125 and the pressure in chamber 133, and shifting valve spool 123 to the left as shown in FIGURE 18 or downwardly as shown in FIGURE 1A. This will connect chamber 133 with port 124 which in turn is connected to exhaust port 105 through chamber 155. Since chamber 133 is connected to chamber 157 through gasket passage 164, piston area 156 will also be exhausted. Thus, piston area 154, which is connected to supply port 103, will cause valve spool 102 to be shifted to the left as shown in FIGURE 20 (downwardly in FIGURE 1A). This in turn will serve to connect working port 104 with exhaust port 105. Piston area 151 of valve spool 135, which is connected to chamber 133 through restriction 152, check valve bore 137 and gasket passage 164, will also be connected to exhaust, but since pressure is applied to chamber 144, valve spool 135 will remain in its right-hand position (upper position in FIGURE 1A).

When push button 109 is again released, signal port 106 will be connected to exhaust. This will exhaust chamber 126 of bore 118 through gasket passage 132 and check valve 161. Valve spool 123 will thus be shifted to its right-hand position as seen in FIGURE 9 (upper position in FIGURE 1A) by spring 125. Chamber 144 will likewise be connected to exhaust through passage 145 in valve spool 135, chamber 143 and port 106. This will cause valve spool 135 to shift to the left (downwardly in FIGURE 1A) due to spring 142. Any remaining pressure trapped in chamber 144 after spool 135 has shifted will be permitted to escape through passage 145, chamber 143, gasket passage 150, chamber 126, gasket passage 132, and check valve 161 to signal port 106. This pressure relief means would be especially important where incompressible fluid is being used. Valve 102 will remain in its exhaust position due to the pressure on piston area 154. The parts will thus be in their positions shown in FIGURES 1A, 9, 10 and 11 and will be ready for a repetition of the cycle described above.

In view of this description of the operation, the general functions of the various valve spools could be generally stated as follows: Valve spool 102 could be termed an actuating spool, since it directly controls the connection of fluid motor 110 to supply or exhaust. Valve spool 123 may be identified as an exhaust spool in that it is movable between a closed position (FIGURES 9, 12 and 15) and an exhaust position (FIGURE 18) in which it causes actuating spool 102 to be shifted to its exhaust position. Valve spool 135 could be termed a control spool in that it is shiftable between a first position (FIGURES 9 and 12) in which application of signal pressure will cause the actuating spool to shift to its supply position, and a second position (FIGURES 15 and 18) in which application of signal pressure will cause exhaust spool 123 to shift to its exhaust position. The position of check valve 136 between control spool 135 and piston area 156 of actuating spool 102 serves to maintain the actuating spool in its supply position when signal port 106 is first connected to exhaust after being pressurized. At the same time, the first exhaustion of signal port 106 causes the control spool to shift to its right-hand position (upper position in FIGURE 1A) because of pressure on piston area 151 trapped by check valve 136. This shifting enables actuation of exhaust spool 123 when the signal port is next pressurized. Shifting of the control spool also cuts off the connection between signal port 106 and check valve 136. When exhaust valve 123 shifts to its left-hand position (lower position in FIGURE 1A) upon the second pressurizing of signal port 106, not only will actuating valve 102 be caused to shift to its exhaust position, but piston area 151 will be depressurized, readying control spool 135 for leftward shifting (downwardly shifting in FIGURE 1A). The presence of check valve 161 in the connection between chamber 126 of exhaust spool 123 and signal port 106 insures that the exhaust spool will return to its closed position when the signal port is exhausted for the second time. The piston areas acting on control spool 135 are so arranged that when the signal port is depressurized for the second time the control spool will be returned to its first position by spring 142 in readiness for another cycle.

It should be observed that the illustrated embodiment of the invention could be varied in several ways within the principles of the invention. For example, springs 125 and 142 could be replaced by fluid pressure, and piston area 154 could be replaced by a spring. The unit could also be made suitable for either compressible or incompressible fluids.

FIGURES 21–38 show another embodiment of the invention which is similar in principle to the first embodiment but which utilizes four valve spools. In essence, this embodiment differs from the previous one in that a fourth valve spool is included which performs some of the functions of the differential areas on control spool 135, the control spool in the present embodiment being of correspondingly simpler construction.

Figures 21, 22, 23, 24, 25, 26:
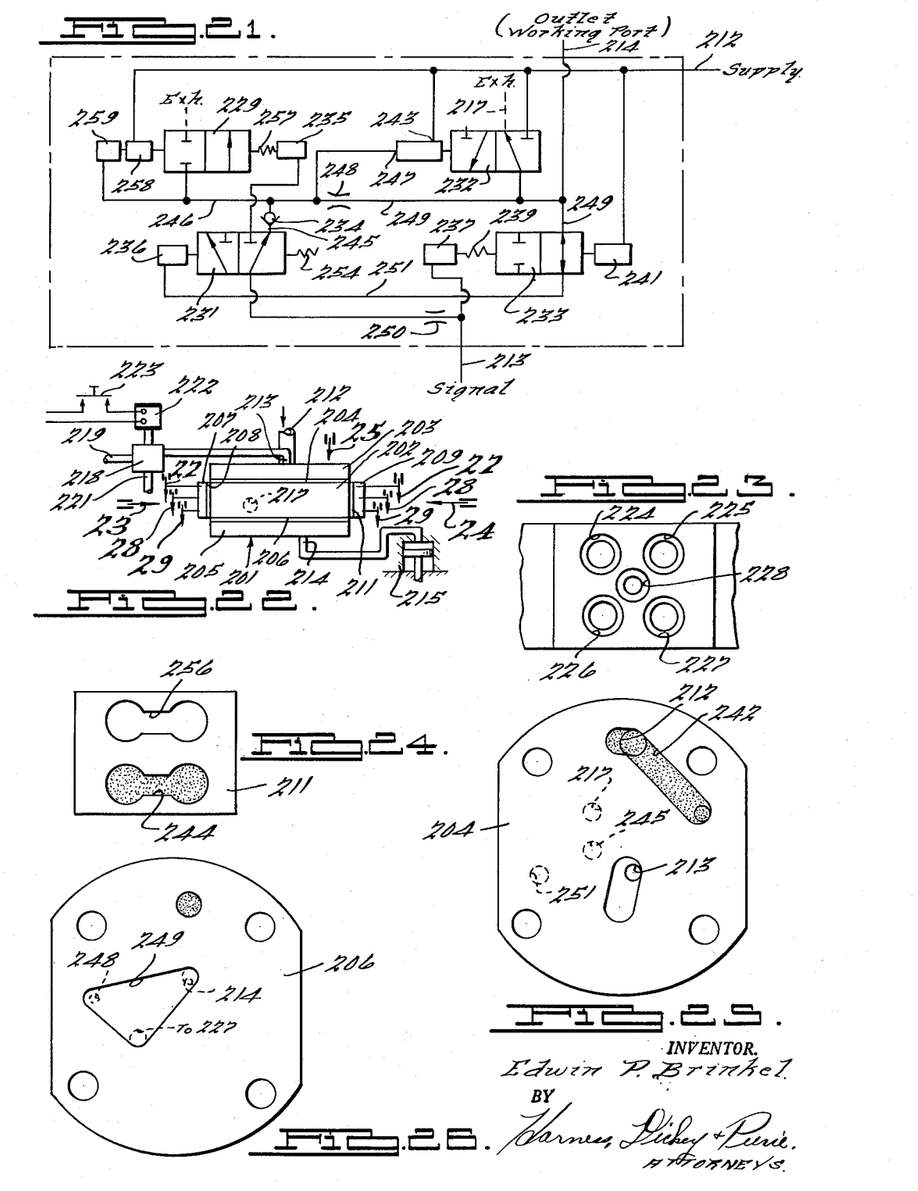
FIGURE 21 is a schematic circuit diagram showing the components of another embodiment of the invention which utilizes four valve spools.
FIGURE 22 is a partially schematic view of a system utilizing the embodiment of FIGURE 21 and showing the shaftable mechanism housing and covers in elevation.
FIGURE 23 is a fragmentary end elevational view of the housing taken in the direction of the arrow 23 of FIGURE 22 and showing the locations of the valve spools.
FIGURE 24 is an elevational view of the gasket adjacent the opposite end of the housing, taken in the direction of the arrow 24 of FIGURE 22.
FIGURE 25 is a top plan view of the top housing gasket taken in the direction of the arrow 25 of FIGURE 22.
FIGURE 26 is a top plan view of the bottom gasket taken in the same direction as FIGURE 25.

Referring to FIGURE 22, the shiftable mechanism is generally indicated at 201 and comprises a flat cylindrical housing 202 with a top cover 203, a top gasket 204, a bottom cover 205, a bottom gasket 206, a left-hand end cover 207, a left-hand gasket 208, a right-hand end cover 209 and a right-hand gasket 211. Mechanism 201 is provided with a pressure supply port 212 extending through cover 203 and gasket 204, a signal port 213, a working port 214 connected to a motor 215, and an exhaust port 217. Port 213 extends through top cover 203 while port 214 extends through bottom cover 205 and exhaust port 217 extends from the side of the housing. Signal port 213 is connected to a three-way valve 218 having a supply port 219 and an exhaust port 221 and being controlled by means such as momentarily actuatable solenoid 222 controlled by a push button 223.

As seen in FIGURE 23, housing 202 is provided with bores 224, 225, 226 and 227, as well as a central bore 228. Bore 224 carries an exhaust spool 29 and bore 225 carries a control spool 231, while bore 226 carries an actuating spool 232 and bore 227 carries an auxiliary control spool 233.

Actuating spool 232 is similar in construction to spool 102 of the previous embodiment in that it is movable between a left-hand position in FIGURE 21 (lower position in FIGURE 21A) in which working port 214 is connected to exhaust port 217, and a right-hand position (upper position in FIGURE 21A) in which supply port 212 is connected to working port 214. Control spool 231 is movable between a left-hand position as shown in FIGURE 21 (lower position in FIGURE 21A) in which signal port 213 is connected to the entrance of a check valve 234, and a right-hand position (upper position in FIGURE 21A) in which the signal port is connected to a chamber 235 at the right-hand end of bore 224. Exhaust spool 229 is shiftable between a right-hand position as shown in FIGURE 21 (upper position in FIGURE 21A) in which the valve is closed and a left-hand position (lower position in FIGURE 21A) in which the exit of check valve 234 is connected to exhaust. Auxiliary control spool 233 is movable between a left-hand position as shown in FIGURE 21 (lower position in FIGURE 21A) in which working port 214 is connected to a chamber 236 at the left-hand end of bore 225, (lower end in FIGURE 21A), and a right-hand position (upper position in FIGURE 21A) in which this connection is cut off. Spool 233 is shifted from its left-hand to its right-hand position (from its lower to its upper position in FIGURE 21A) each time signal port 213 is pressurized, this signal pressure being conducted to a chamber 237 at the left-hand end of bore 227.

The remaining constructional features of mechanism 201 may perhaps best be understood by a description of the operational sequence of the mechanism, reference being made particularly to FIGURES 21A and 27–38. Assuming an initial condition in which signal port 213 is connected to exhaust and working port 214 is likewise exhausted, application of pressure to signal port 213 will cause the parts to be shifted from their positions shown in FIGURES 21A and 27–29 to the positions shown in FIGURES 30–32. More specifically, port 213 extends through housing 202, passing through bore 225 and into a chamber 238 of bore 227. Chamber 238 leads to a passage 239 in spool 233, this passage leading to chamber 237, and spool 233 will thus move to the right (upwardly in FIGURE 21A) with the aid of a spring 240 in chamber 237. This movement will be against the pressure exerted on the right-hand end of spool 233 (upper end in FIGURE 21A) by fluid in a chamber 241 which is under constant pressure from supply port 212. This pressure passes through a passage 242 in gasket 204, a passage 242' which connects passage 242 with a chamber 243 in the right-hand end of bore 226 (upper end in FIGURE 21A), and a passage 244 in gasket 211 which connects chambers 243 and 241. Passage 242' also passes through a chamber 258 in bore 224 and maintains this chamber under constant pressure, for purposes described below.

Figure 32:
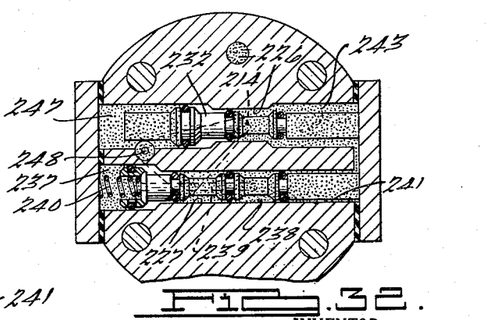

The pressure at signal port 213 will also pass through bore 225 for valve spool 231, from where it will flow through a passage 245 to check valve 234, and from bore 228 through a passage 246 to the left-hand chamber 247 (lower chamber in FIGURE 21A) of actuating spool 232. This will cause valve spool 232 to shift to its right-hand position as seen in FIGURE 32 (upper position in FIGURE 21A), connecting working port 214 to constantly pressurized chamber 243. Motor 215 will thus be actuated. Pressure will also flow through a restricted passage 248, aligned with passage 246 as seen in the figures, to a triangular passage 249 formed in gasket 206. Passage 249 connects restriction 248 with working port 214. This connection will insure the continued application of pressure to chamber 247 from chamber 243 even after the signal pressure has been removed. The shifting of spool 232 and pressurization of working port 214 (which is connected to bore 227 by gasket passage 249) serves to ready valve spool 233 for shifting spool 231 in the next step of the cycle, as described below. For the time being, however, this pressure has no effect since spool 233 is in its closed position. The presence of flow resistance (represented by a restriction 250 in FIGURES 21 and 21A) in the path leading from signal port 213 to chamber 247 insures that valve spool 233 will shift to its closed position before pressure is built up in the central portion of bore 227.

Figure 33:
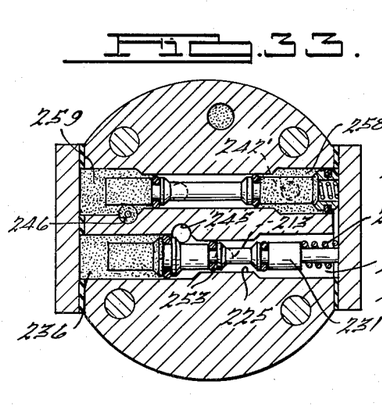
FIGURES 33, 34 and 35 are views showing the parts after pressure has been removed from the signal connection.
Figure 34:
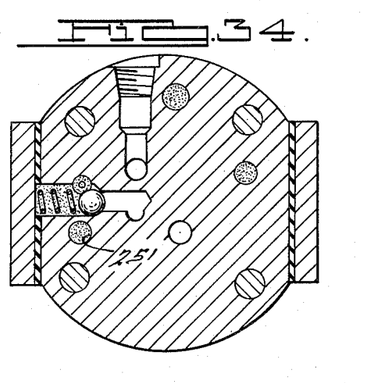
Figure 35:
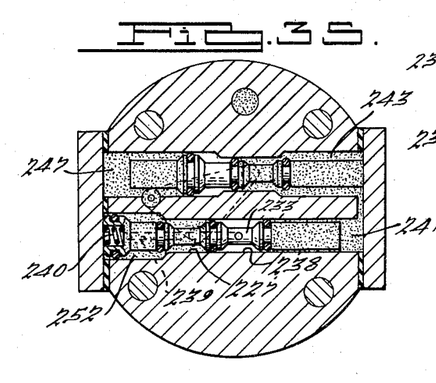

Upon deenergization of solenoid 221, signal port 213 will be connected to exhaust. Due to check valve 234, chamber 247 of bore 226 as well as the central portion of bore 227 will remain pressurized, this pressure being supplied from chamber 243 to triangular passage 249. Chambers 237 and 238 will be evacuated, and the pressure in chamber 241 will cause spool 233 to shift to the left as shown in FIGURE 35 (downwardly in FIGURE 21A). This will cause pressurizing of a passage 251 leading from a chamber 252 in bore 227 to chamber 236 in the left-hand portion of bore 225 (lower portion in FIGURE 21A). This will cause valve 231 to shift to the right as shown in FIGURE 33 (upwardly in FIGURE 21A), closing a valve member 253 against the action of a spring 254, thus shutting off signal port 213 from passage 245. This will have no immediate effect, and working port 214 will remain pressurized. At the same time, signal port 213 will be connected to a chamber 255 at the right-hand end of bore 225 (upper end in FIGURE 21A), this chamber leading to chamber 235 at the right-hand end of exhaust spool 229 (upper end in FIGURE 21A) through a passage 256 in gasket 211. This will place the parts in readiness for shifting of exhaust spool 229 to its exhaust position during the next step of the cycle. For the time being, however, spool 229 will be held in its right-hand position (upper position in FIGURE 21A) against the force of a spring 257 by a constantly pressurized differential area in chamber 258 connected to passage 242', and a chamber 259 at the left-hand end of bore 224 (lower end in FIGURE 21A) which is connected with passage 246.

Figure 21A:
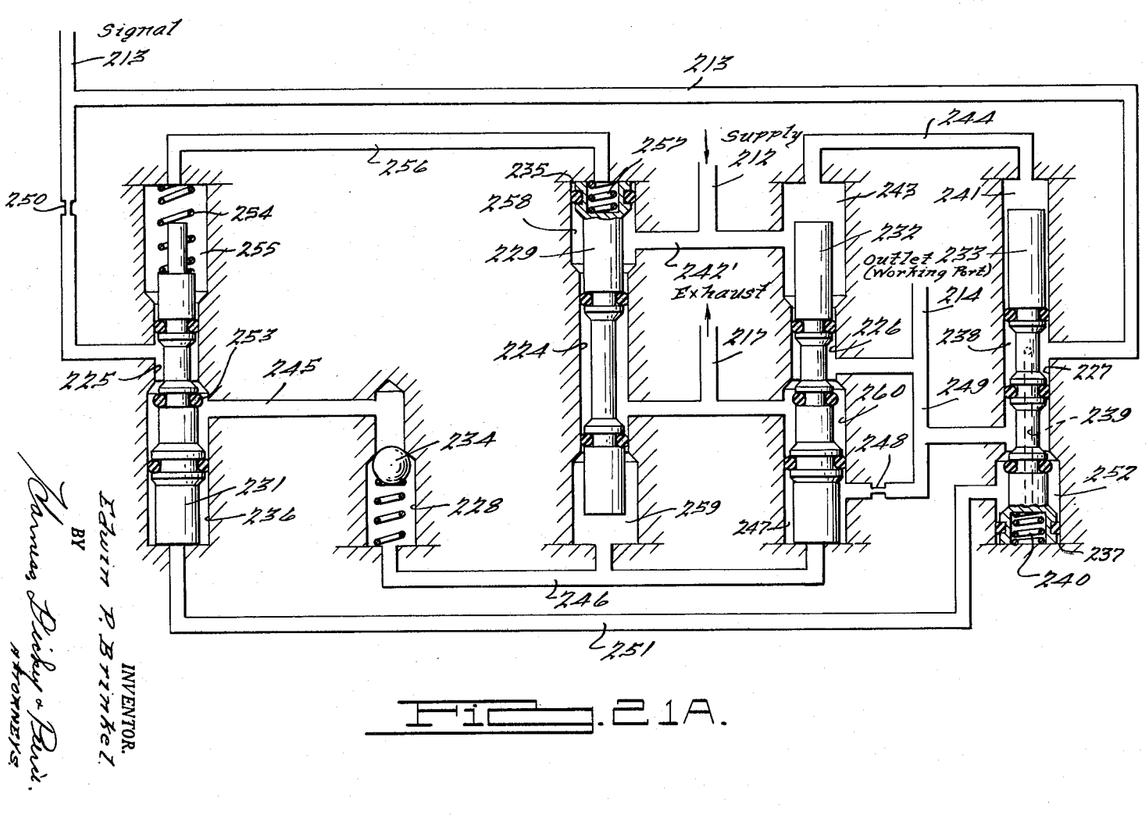
FIGURE 21A is another form of the schematic circuit diagram of FIGURE 21, showing suitable valve constructions.
Figure 36:
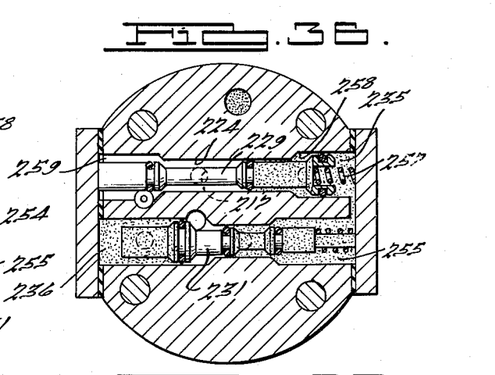
FIGURES 36, 37 and 38 are views showing the parts after reapplication of signal pressure.
Figure 37:
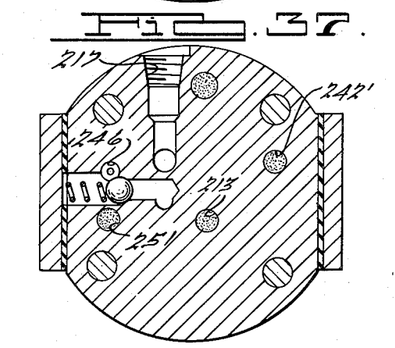
Figure 38:
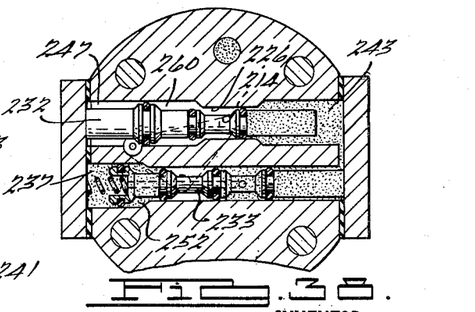

Upon reapplication of signal pressure to port 213, valve spool 233 will again be shifted to the right as shown in FIGURE 38 (upwardly in FIGURE 21A). Chamber 252, passage 251 and chamber 236 will remain pressurized, thus maintaining valve spool 231 in its right-hand position (upper position in FIGURE 21A). Pressure will flow from port 213 through chamber 255 and passage 256 to chamber 235, thus shifting exhaust spool 229 to its left-hand position as seen in FIGURE 36 (lower position in FIGURE 21A). Chamber 259 at the left-hand end of bore 224 (lower end in FIGURE 21A) will thus be connected to exhaust port 217 which leads through the central portion of bore 229. Passage 246 and chamber 247 of bore 226 will thus also be connected to exhaust, and the constant pressure in chamber 243 will cause valve spool 232 to shift to its left-hand position as shown in FIGURE 38 (lower position in FIGURE 21A). Working port 214 will thus be connected to a chamber 260 in bore 226 which leads to exhaust port 217. The presence of restriction 250 will prevent the depressurization of chamber 252 before valve spool 233 closes.

Figure 27:
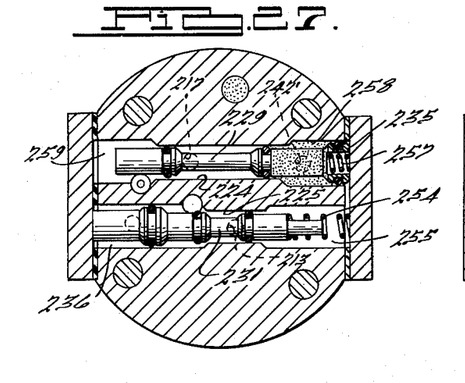
FIGURES 27, 28 and 29 are cross-sectional views taken along the lines 27—27, 28—28 and 29—29, respectively, of FIGURE 22 and showing the various mechanism components in a starting position, pressurized portions of the mechanism being indicated by dots.
Figure 28:
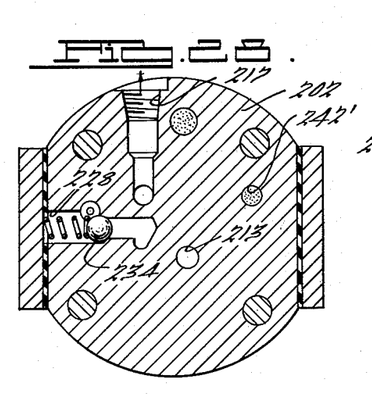
Figure 29:
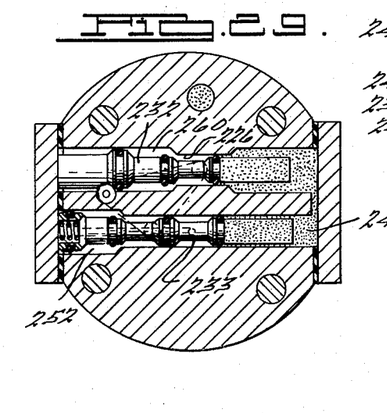
Figure 30:
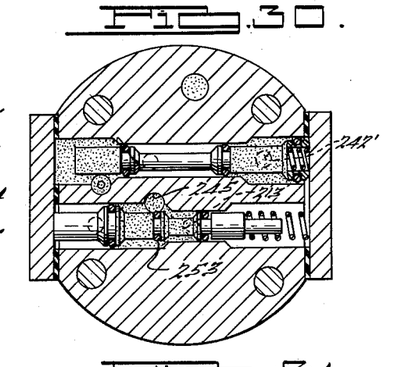
FIGURES 30, 31 and 32 are views similar to FIGURES 27, 28 and 29, respectively, showing the parts in a second position after initial application of pressure to the signal connection.
Figure 31:
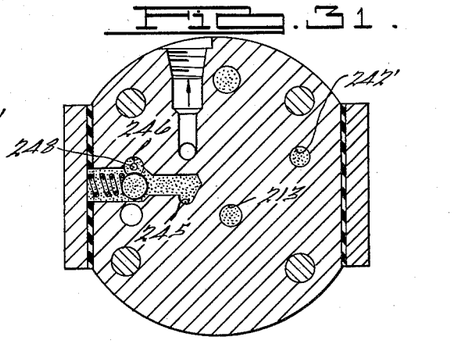

Upon the second release of pressure from signal port 213, the pressure in chambers 255 and 235 will be exhausted, and the constant pressure applied to chamber 258 will cause valve spool 229 to be shifted to the right as shown in FIGURE 27 (downwardly in FIGURE 21A). This will close the connection between the chamber 259 and exhaust port 217. Release of pressure from chamber 237 will cause valve spool 233 to be shifted to the left as seen in FIGURE 29 (downwardly in FIGURE 21A) by the pressure in chamber 241. Chamber 252 will thus be connected with triangular passage 249 which in turn is connected to exhaust through bore 226 and chamber 260. Since chamber 236 of bore 225 is connected to chamber 252 through passage 251, valve spool 231 will be shifted to the left as seen in FIGURE 27 (downwardly in FIGURE 21A) by spring 254. This will reopen the connection between signal port 213 and check valve 234 in readiness for another cycle. The parts will be in their original position as shown in FIGURES 21A and 27-29 with working port 214 connected to exhaust.

As in the previous embodiment of the invention, it will be noted that the parts could be altered, for example by substituting differential areas for return springs. Actuating valve 232 could be a separate unit if desired, and could also be altered so as to control a double acting fluid motor.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a fluid-actuated shiftable mechanism, an actuating member movable between first and second positions, means urging said actuating member toward its first position, fluid pressure responsive means for overcoming said first means and moving said member to its second position, a signal port, a control valve movable between a first position connecting and a second position disconnecting said signal port and said fluid pressure responsive means, means urging said control valve toward its first position, whereby a first application of pressure to said signal port will cause said actuating member to shift to its second position, means responsive to release of said first pressure application for maintaining the pressurized condition of said fluid pressure responsive means and shifting said control valve to its second position, means responsive to a second pressure application to said signal port for releasing the pressure on said fluid pressure responsive means, whereby said actuating member will return to its first position, and means responsive to release of said second pressure application for returning said control valve to its first position.

2. In a fluid actuated shiftable mechanism, an actuating valve movable between supply and exhaust positions, means constantly urging said actuating valve toward its exhaust position, a piston area for overcoming said first means and moving said actuating valve to its supply position, a signal port, a control valve movable between a first position connecting and a second position disconnecting said signal port and said piston area, means urging said control valve toward its first position whereby a first application of pressure to said signal port will cause said actuating valve to shift to its supply position, means responsive to release of said first pressure application for maintaining the pressurized condition of said piston area and shifting said control valve to its second position, means responsive to a second pressure application to said signal port for releasing the pressure on said piston area, whereby said actuating valve will return to its exhaust position, and means responsive to release of said second pressure application for returning said control valve to its first position.

3. In a fluid actuated shiftable mechanism, an actuating member movable between first and second positions, means constantly urging said actuating member toward its first position, fluid pressure responsive means for overcoming said first means and moving said actuating member to its second position, a signal port, a control valve movable between a first position connecting and a second position disconnecting said signal port and said fluid pressure responsive means, means urging said control valve toward its first position whereby by a first application of pressure to said signal port will cause said actuating member to shift to its second position, a check valve for maintaining the pressurized condition of said fluid pressure responsive means upon release of said first pressure application, means responsive to said release for shifting said control valve to its second position, means responsive to a second pressure application to said signal port for releasing the pressure on said fluid pressure responsive means, whereby said actuating member will return to its first position, and means responsive to release of said second pressure application for returning said control valve to its first position.

4. The combination according to claim 3, the means for shifting said control valve to its second position comprising a first differential area connected to said signal port when said control valve is in its first position and urging the control valve toward its first position, a second differential area for urging said control valve to its second position, and a restricted connection between said signal port and said second differential area when said control valve is in its first position, said check valve preventing flow from said second differential area to said signal port when the signal port is depressurized.

5. The combination according to claim 3, further provided with an exhaust valve movable from a closed position to an exhaust position connecting said fluid pressure responsive means to exhaust, means urging said exhaust valve to its closed position, and means responsive to application of pressure to said signal port when said control valve is in its second position for moving said exhaust valve to its exhaust position.

6. The combination according to claim 5, the means for urging said exhaust valve to its exhaust position comprising a differential area, and a check valve connecting said differential area to said signal port whereby release of signal port pressure will permit said exhaust valve to return to its closed position.

7. The combination according to claim 3, the means for shifting said control valve to its second position comprising a differential area, a connection between said fluid pressure responsive means and said differential area when said control valve is in its first position, an auxiliary control valve movable between an open first position and a second position closing said last-mentioned connection, means urging said auxiliary control valve to its open position, and means responsive to application of pressure to said signal port to move said auxiliary control valve to its closed position.

8. The combination according to claim 7, further provided with a restriction in the connection leading to said control valve differential area, whereby said auxiliary control valve will be moved to its closed position upon a first application of pressure to said signal port before said control valve moves to its second position.

9. In a fluid actuated shiftable mechanism, an actuating valve having supply, exhaust and working ports and movable between supply and exhaust positions, means constantly urging said actuating valve toward its exhaust position, a differential area for overcoming said first means and moving said actuating valve to its supply position, a signal port, a control valve movable between a first position connecting and a second position disconnecting said signal port and said differential area, means urging said control valve toward its first position whereby a first application of pressure to said signal port will cause said actuating valve to shift to its supply position, means responsive to release of said first pressure application for maintaining the pressurized condition of said differential area and shifting said control valve to its second position, a restricted feedback connection leading from the working port of said actuating valve to said differential area for maintaining pressure on said differential area after said signal port pressure has been released, means responsive to a second pressure application to said signal port for releasing the pressure on said differential area, whereby said actuating valve will return to its exhaust position, and means responsive to release of said second pressure application for returning said control valve to its first position.

10. In a fluid actuated shiftable mechanism, an actuating member movable between first and second positions, means constantly urging said actuating member toward its second position, a differential area for overcoming said first means and moving said actuating member to its first position, a signal port, a control valve movable between a first position connecting and a second position disconnecting said signal port and said differential area, a check valve in the connection between said control valve and said differential area permitting flow only to said differential area, a first control valve differential area for urging the control valve toward its second position, a restricted connection between the exit side of said check valve and said first control valve differential area, means actuatable by signal pressure when said control valve is in its second position for releasing pressure from said actuating member and first control valve differential areas, a second differential area on said control valve for urging the control valve toward its first position, an unrestricted connection between said second differential area and said signal port when the control valve is in its first position, means constantly urging said control valve toward its first position, and a third differential area connected to said signal port when said control valve is in its second position and adapted to urge said control valve toward its second position, whereby said control valve will be held in its second position after pressure has been released from said first control valve area by said pressure releasing means.

11. The combination according to claim 10, said pressure releasing means comprising an exhaust valve, means constantly urging said exhaust valve toward a closed position, a fluid pressure area for urging said exhaust valve to a second position connecting said actuating member and first control valve areas to exhaust, an unrestricted connection between said signal port and said exhaust valve area when said control valve is in its second position, a second connection extending directly between said exhaust valve area and said signal port, and a check valve in said second connection permitting flow only to said signal port.

12. In a fluid actuated shiftable mechanism, an actuating spool having a supply port, and exhaust port and a working port and movable between supply and exhaust positions, means constantly urging said actuating spool toward its exhaust position, a fluid pressure area for urging said actuating spool toward its supply position, a signal port, a control spool, means constantly urging said control spool toward a first position connecting said signal port with said actuating spool fluid pressure area, a check valve in the connection between said control spool and said area permitting flow only to the area from said control spool, a fluid pressure area on said control spool for urging the control spool to a second position shutting off the connection to said check valve, an exhaust spool, an exhaust connection leading from said actuating spool fluid pressure area to said exhaust spool, means constantly urging said exhaust spool toward a closed position, a fluid pressure area on said exhaust spool for urging the exhaust spool to an open position exhausting said actuating spool fluid pressure area, a connection between said signal port and said exhaust spool fluid pressure area when said control spool is in its second position, a fluid pressure area on said control spool for urging the control spool to its second position, a connection between said working port and said control spool fluid pressure area, an auxiliary control spool in said last-mentioned connection, means constantly urging said auxiliary control spool to an open position, and a fluid pressure area on said auxiliary control spool connected to said signal port for urging the auxiliary control spool to a closed position.

13. In a fluid actuated shiftable mechanism, a signal port, an actuating spool having supply, exhaust and working ports and movable between a first position connecting the exhaust port and a second position connecting the supply port to said working port, means constantly urging said actuating spool toward its first position, an area on said actuating spool responsive to fluid pressure to move the actuating spool to its second position, a fluid connection between said signal port and said area, a control spool movable between a first position opening said connection and a second position closing said connection, means urging said control spool to its first position whereby a first application of pressure to said signal port will cause said actuating spool to shift to its second position, a check valve in the connection between said control spool and said area for maintaining the pressurized condition of said area after said signal port is depressurized, an area on said control spool responsive to fluid pressure to move the control spool to its second position, a connection between the exit side of said check valve and said control spool area, first delay means for causing said control spool area to be ineffective to shift the control spool to its second position until a second depressurization of said signal port, an exhaust spool movable between a closed position and a second position connecting the exit side of said check valve to exhaust, means constantly urging said exhaust spool to its closed position, an area on said exhaust spool responsive to fluid pressure to move the exhaust spool to its second position, a connection between said signal port and said exhaust spool area, said connection being open when said control spool is in its second position and closed when the control spool is in its first position, whereby a second application of pressure to said signal port will cause said actuating spool to move to its first position and will depressurize said control spool area, and second delay means for causing said control spool urging means to be ineffective to return the control spool to its first position until a second depressurization of said signal port.

14. The combination according to claim 13, said first delay means comprising a second area on said control spool responsive to fluid pressure for urging the control spool to its first position, an unrestricted connection between the entrance side of said check valve and said second control spool area, and a restriction in the connection between the exit side of said check valve and the first control spool area.

15. The combination according to claim 14, said second delay means comprising a third control spool area connected to said exhaust spool area and responsive to fluid pressure to urge the control spool to its second position.

16. The combination according to claim 13, said first and second delay means comprising a connection between said working port and said control spool area, an auxiliary control valve in said last-mentioned connection, means urging said auxiliary control valve to an open position, and means responsive to signal port pressure for moving the auxiliary control valve to a closed position.

17. The combination according to claim 13, further provided with a restricted feedback connection between said working port and said actuating spool area.

18. In a fluid actuated shiftable mechanism, a housing, supply, exhaust, signal and working ports in said housing, first, second and third bores within said housing, an actuating spool within said first bore and movable between a first position connecting said exhaust port and a second position connecting said supply port to said working port, means constantly urging said actuating spool toward its first position, an area on said actuating spool responsive to fluid pressure to move the actuating spool to its second position, a fluid connection between said signal port and said area, a control spool in said second bore movable between a first position opening said connection and a second position closing said connection, means urging said control spool to its first position whereby a first application of pressure to said signal port will cause said actuating spool to shift to its second position, a check valve within said housing in the connection between said control spool and area for maintaining the pressurized condition of said area after said signal port is depressurized, an area on said control spool responsive to fluid pressure to move the control spool to its second position, a restricted connection between the exit side of said check valve and said control spool area, a second area on said control spool responsive to fluid pressure for urging the control spool to its first position, an unrestricted connection between the entrance side of said check valve and said second area, whereby the control spool will be shifted to its second position upon said first signal port pressure release, an exhaust spool in said third bore movable between a closed position and a second position connecting the exit side of said check valve to exhaust, means constantly urging said exhaust spool to its closed position, an area on said exhaust spool responsive to fluid pressure to move the exhaust spool to its second position, a connection between said signal port and said exhaust spool area, said connection being open when said control spool is in its second position and closed when the exhaust spool is in its first position, whereby a second application of pressure to said signal port will cause said actuating spool to move to its first position and will depressurize said first control spool area, and a third control spool area connected to said exhaust spool area and responsive to fluid pressure to urge the control spool to its second position, whereby said control spool will be maintained in its second position until the second depressurization of said signal port.

References Cited in the file of this patent

UNITED STATES PATENTS

| | | |
|---|---|---|
| 2,382,224 | Hicks | Aug. 14, 1945 |
| 2,688,314 | Holm et al. | Sept. 7, 1954 |
| 2,854,956 | Hager | Oct. 7, 1958 |
| 2,900,960 | Gratzmuller | Aug. 25, 1959 |